United States Patent
Murray et al.

(10) Patent No.: US 12,420,513 B2
(45) Date of Patent: Sep. 23, 2025

(54) MACHINE FOR PRODUCTION OF STAND UP POUCHES

(71) Applicant: Pouch Pac Innovations, LLC, Sarasota, FL (US)

(72) Inventors: R. Charles Murray, Sarasota, FL (US); Olaf Clemens, Wipperfurth (DE)

(73) Assignee: Pouch Pac Innovations, LLC, Sarasota, FL (US)

( * ) Notice: Subject to any disclaimer, the term of this patent is extended or adjusted under 35 U.S.C. 154(b) by 115 days.

(21) Appl. No.: 17/170,042

(22) Filed: Feb. 8, 2021

(65) Prior Publication Data

US 2021/0347141 A1  Nov. 11, 2021

Related U.S. Application Data

(60) Provisional application No. 62/970,807, filed on Feb. 6, 2020.

(51) Int. Cl.
| | |
|---|---|
| *B31B 70/00* | (2017.01) |
| *B29C 65/00* | (2006.01) |
| *B29C 65/18* | (2006.01) |
| *B31B 70/10* | (2017.01) |
| *B31B 70/16* | (2017.01) |
| *B31B 70/26* | (2017.01) |
| *B31B 70/64* | (2017.01) |
| *B31B 155/00* | (2017.01) |

(52) U.S. Cl.
CPC ............ *B31B 70/006* (2017.08); *B29C 65/18* (2013.01); *B29C 66/43121* (2013.01); *B29C 66/8511* (2013.01); *B29C 66/932* (2013.01); *B29C 66/95* (2013.01); *B31B 70/10* (2017.08); *B31B 70/16* (2017.08); *B31B 70/26* (2017.08); *B31B 70/642* (2017.08); *B31B 2155/00* (2017.08)

(58) Field of Classification Search
CPC ..... B31B 70/006; B31B 70/642; B31B 70/26; B31B 70/10; B31B 70/16; B31B 2155/00; B29C 65/18; B29C 66/43121; B29C 66/8511; B29C 66/932; B29C 66/95
USPC ........................................................ 493/194
See application file for complete search history.

(56) References Cited

U.S. PATENT DOCUMENTS

| | | | | |
|---|---|---|---|---|
| 4,223,201 A | * | 9/1980 | Peters ................... | B23K 26/10 219/121.76 |
| 4,242,955 A | * | 1/1981 | Wassermann .............. | B41J 9/38 400/157.2 |
| 4,327,638 A | * | 5/1982 | Wassermann .............. | B41J 9/38 101/93.09 |
| 5,080,747 A | * | 1/1992 | Veix ................... | B29C 66/83221 156/364 |
| 5,113,736 A | * | 5/1992 | Meyerle .................... | B30B 1/42 83/575 |
| 5,245,904 A | * | 9/1993 | Meyerle ................ | B30B 15/041 83/575 |

(Continued)

*Primary Examiner* — Sameh Tawfik
(74) *Attorney, Agent, or Firm* — Fishman Stewart PLLC

(57) ABSTRACT

A machine for the production of a stand up pouch from a web includes a film feed which moves the web at continuously at a constant speed through a punching station, a folding station, and a welding station. The welding station includes a pair of seal bars which are driven by a server motor at a speed equal to a speed of the web during the welding. The punch station includes at least one electromagnetic punch.

13 Claims, 2 Drawing Sheets

(56) References Cited

U.S. PATENT DOCUMENTS

| | | | | |
|---|---|---|---|---|
| 5,315,807 A * | 5/1994 | Restle | B65B 57/02 | 53/562 |
| 5,722,217 A * | 3/1998 | Cloud | B65B 9/087 | 53/562 |
| 5,833,107 A * | 11/1998 | Terranova | B65H 23/1886 | 493/193 |
| 6,024,683 A * | 2/2000 | Wilkes | B65H 35/08 | 493/210 |
| 6,217,497 B1 * | 4/2001 | Laudenberg | B31B 50/00 | 493/194 |
| 6,381,919 B2 * | 5/2002 | Todd | B29C 66/849 | 53/64 |
| 7,331,265 B2 * | 2/2008 | Settepani | B30B 1/42 | 83/575 |
| 9,505,189 B2 * | 11/2016 | Murray | B31B 50/00 | |
| 10,065,770 B2 * | 9/2018 | Howell | B65D 33/2508 | |
| 10,913,608 B2 * | 2/2021 | Sieksmeier | B65G 17/20 | |
| 10,928,157 B1 * | 2/2021 | Busch, II | H05H 15/00 | |
| 2002/0152719 A1 * | 10/2002 | Kinigakis | B65B 61/188 | 53/133.4 |
| 2004/0057637 A1 * | 3/2004 | Nishibe | B65D 75/5894 | 383/66 |
| 2005/0210951 A1 * | 9/2005 | Settepani | B30B 1/42 | 72/430 |
| 2008/0011225 A1 * | 1/2008 | McClure | C23C 14/562 | 118/244 |
| 2012/0076616 A1 * | 3/2012 | Satsukawa | B42B 5/103 | 412/14 |
| 2014/0357462 A1 * | 12/2014 | Voss | B65B 9/13 | 53/64 |
| 2015/0238044 A1 * | 8/2015 | Halliday | B65D 85/8058 | 99/283 |
| 2017/0197403 A1 * | 7/2017 | Keil | B41F 17/002 | |
| 2017/0197404 A1 * | 7/2017 | Behnke | B41F 17/20 | |
| 2022/0194448 A1 * | 6/2022 | Mian | B61L 1/06 | |

* cited by examiner

MACHINE FOR PRODUCTION OF STAND UP POUCHES

CROSS-REFERENCE TO RELATED APPLICATIONS

This Application claims the benefit of U.S. Provisional Application 62/970,807 filed on Feb. 6, 2020.

FIELD OF THE INVENTION

A machine for the product of stand up pouches and, more particularly, a machine which continuously feeds film for the production of stand up pouches.

BACKGROUND OF THE INVENTION

Machines for the production of stand up pouches are known. A film web is moved by an intermittent film feed, through a punching station, a folding station, and a sealing station. When producing stand up pouches, the film is folded into a ⟦W⟧ shape and sealed to form a standup bottom. In order to properly seal through the outer layers of the ⟦W⟧ together, it is necessary to cut holes in each of the inner portions of the ⟦W⟧. The bottom of the W has four layers, two outer tall layers and two shorter inner layers to promote better sealing. Because of the time necessary to seal the layers together and to punch the holes, the film is moved intermittently through the stations. During the frequent and abrupt acceleration and braking of the film, the film is subjected to high tensile forces, which can lead to film stretch and deformation of the film. This can result in making the film unstable because the film no longer meets the mechanical and optical requirements. Additionally, components of the machine are subjected to high wear. It is therefore an object of the invention to eliminate the film stretch and to reduce wear on the components of the machine.

SUMMARY OF THE INVENTION

A machine for producing film pouches has a feed mechanism for continuously transporting a web of film through a punch station, a folding station, and a welding station at a constant speed. The welding station has a pair of seal bars which travel with the web during the sealing. The seal bars are mounted to a carriage which is moved by a servomotor. Movement of the carriage is synchronized with the web. A sensor for determining the speed of the web and a print mark sensor for determining the position of a print mark on the film are determined so that a position of the sealing bars and duration of the sealing can be controlled. A high speed punch is used to produce cutouts.

DETAILED DESCRIPTION OF THE PREFERRED EMBODIMENTS

Figure 1:
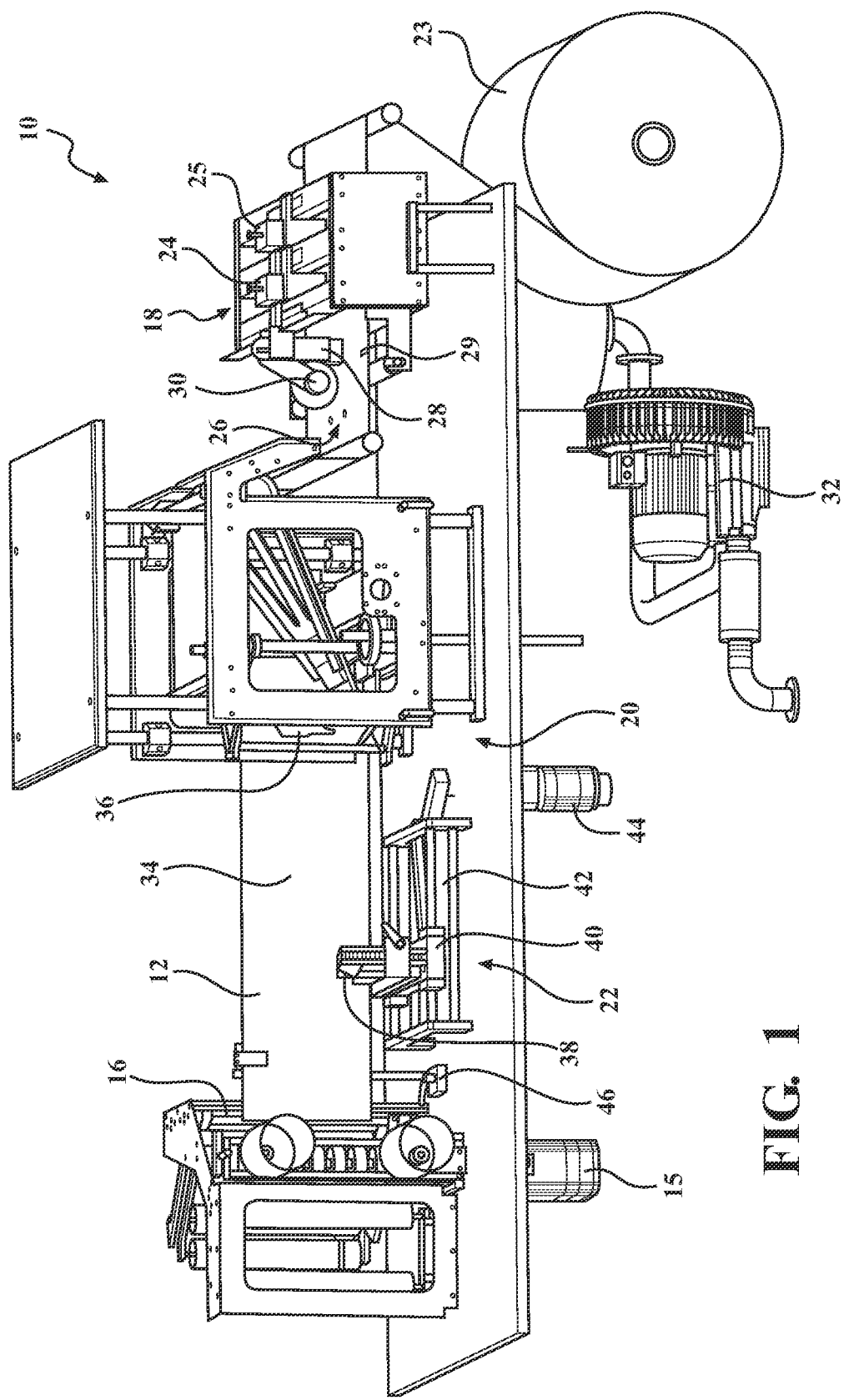
FIG. 1 is a perspective side view of the exemplary embodiment.
Figure 2:
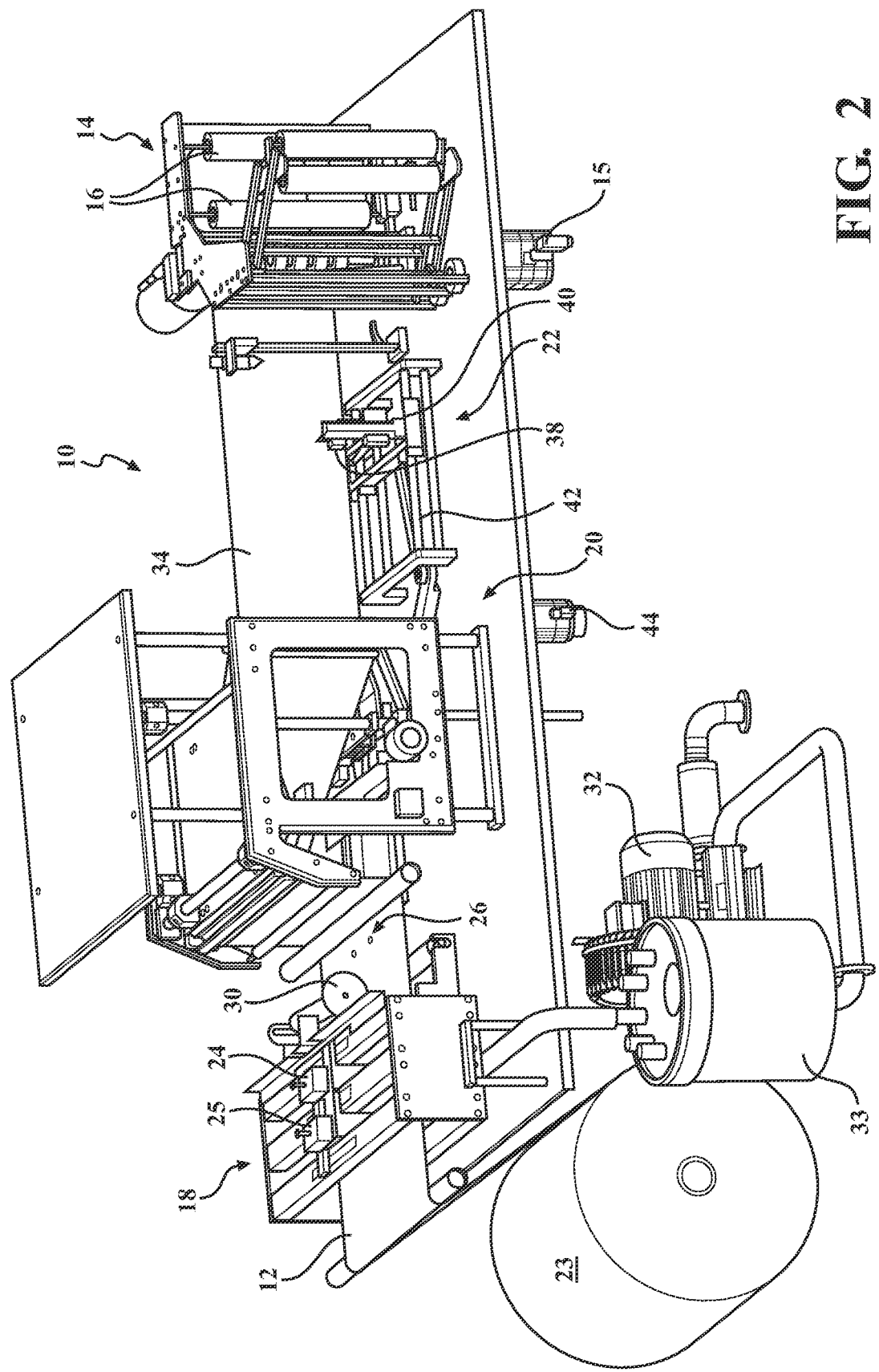
FIG. 2 is shows the embodiment of FIG. 1 from the opposite side.

As shown in FIGS. 1 and 2, a machine 10 for producing stand up pouches from a web 12 of film includes a feed mechanism 14 which moves the film web through a punching station 18, a folding station 20, and a welding station 22. The web 12 is a laminate of layers of flexible film material such as plastic and foil. The web is preprinted with labeling.

Unlike the devices known from the prior art, in which the film web is intermittently drawn between individual processing stations, the web 12 is drawn continuously by the feed mechanism 14 at a constant speed through all stations of the machine. This is accomplished by using a high speed electromagnetic punch and heat seal bars which travel with the web while engaged. Compared to the intermittent film run of the prior art, the continuous film run has the advantage that the film is not subjected to excessive mechanical loads. Thus, the film stretch, i.e., the plastic deformation of the film by accelerating the film is greatly reduced. Furthermore, the wear of the drive elements of the device is reduced.

As shown in FIGS. 1 and 2, the preferred embodiment of a machine 10 includes a continuously running film feed mechanism 14. The feed mechanism has rollers 16 driven by a motor 15 to move the web 12 through the machine 10. The film web 12 is drawn in a longitudinal direction from a roll 23 of film consecutively through the punching station 18, the folding station 20, and the welding station 22.

The punching station 18 is positioned upstream of the folding station 20 and includes at least one electromagnetic punch 24. The punch 24 forms pairs of holes in the film. The punch 24 is extended by an electromagnet to engage the web 12 by a pulsed electric signal. The punch 24 is returned by springs after the pulse. The punch operates very quickly with a very short pulsed signal The punch 24 cuts a pair of holes 26 equally spaced from a center line of the web 12. Typically, two pairs of holes are cut for each pouch. One pair of holes 26 is positioned adjacent to each side of the pouch. Depending on the width of the pouch, another punch 25 can be utilized.

It is important that the holes be properly positioned on the film with respect to the printing. The film is preprinted with packaging information and registration marks 29. A print mark reader such as an optical scanner 28 reads position of the registration 29 mark. The scanner 28 is positioned adjacent to the punching station 18. A film speed sensor such as a rotary encoder 30 positioned on the web near the punch, measures the speed of the web 12. The controller uses the position of the registration mark 29 and speed of the web to synchronize the punching with the position of the web. The speed of the punch is so fast that the web can be punched while moving without causing film stretch. A cross-flow fan 32 suctions punching residues. The punching residue is drawn off by the cross-flow fan 32 and collected in a container 33, positioned beneath the punching station 18.

The film web 12 is then folded into a ⟦W⟧ by at the folding station 20 as is known in the art. The web 12 is pulled over a form which folds the center of the film into a ⟦V⟧ which is sandwiched between two outer portions 34. Each inner portion of the [V⟧ has one of the pair holes 26. An edge control 36 ensures that opposite film edges of the outer portions 34 of the ⟦W⟧ run at exactly the same height after folding so that the pair of holes 26 lie exactly on top of each other after folding by the form.

At the welding station 22, the outer portions 34 of the W fold are welded together over the inner portions. The welding is performed by pneumatically driven pair of heat seal bars 38. The pair of seal bars 38 are mounted to a carriage 40 which travels on rails 42. Each of the seal bars is positioned on one side of the web 12. The carriage 40 is accelerated to the film speed by a servo motor drive system 44 so that the carriage 40 and sealing bars 38 are synchronized to run at the same speed and parallel to the web 12 along the rails. When the carriage 40 gets to the same speed as the web, the seal bars 38 are closed towards each other to engage the web 12. The film speed is determined by the rotary encoder 30 in combination with a second print mark sensor 46. For the correct sealing it is necessary that the sealing bars 38 are engaged with the web 12 for a defined time or distance of travel with the film. The time or distance that the seal bars travel with the film depends on the film speed and the film composition. The speed or time can be regulated by the controller and are varied by an interface. After the sealing is complete, the seal bars are opened and the servomotor is reversed to move the carriage back to the starting position for the next weld.

The invention claimed is:

1. A machine for the production of stand up pouches from a web of film, the machine comprising:
   a feed mechanism adapted to move the web in a feed direction at a constant speed sequentially through a punching station, a folding station, and a welding station, the welding station having a pair of seal bars which travel with the web during engagement with the web;
   wherein the machine further comprises a rotary sensor measuring the speed of the film and an optical scanner determining a position of a registration mark on the web;
   the punching station including a first electromagnetic punch and a second electromagnetic punch that are disposed spaced apart from one another in the feed direction;
   wherein the first electromagnetic punch has a pair of punch structures arranged to cut a first pair of holes in the web adjacent to a first side of a pouch;
   wherein the second electromagnetic punch has a pair of punch structures arranged to cut a second pair of holes in the web adjacent to a second side of the pouch; and
   wherein the pair of punch structures of the first electromagnetic punch and/or the second electromagnetic punch includes a first punch structure and a second punch structure that are disposed equidistant from a center line of the web and, when actuated, cut a pair of holes in the web that are disposed equidistant from the center line of the web.

2. The machine of claim 1, wherein the pair of seal bars are mounted to a carriage.

3. The machine of claim 2, wherein in the carriage is moved by a servo-motor.

4. The machine of claim 1, wherein at least one of the first electromagnetic punch and the second electromagnetic punch operates in response to signal based on the position of the registration mark and the speed of the travel of the web.

5. The machine of claim 1, wherein the seal bars are moved at a speed equal to the speed of the web.

6. The machine of claim 1, wherein the rotary sensor is arranged downstream of the punching station and upstream of the folding station.

7. The machine of claim 1, wherein the rotary sensor is disposed adjacent to the punching station and includes a roller wheel positioned on the web.

8. The machine of claim 1, further comprising a cross-flow fan structured and arranged to draw punching residue from the punching station.

9. The machine of claim 8, further comprising a container connected to the cross-flow fan such that punching residue drawn off via the cross-flow fan flows into and is collected in the container.

10. The machine of claim 9, wherein the cross-flow fan and the container are arranged beneath the punching station.

11. The machine of claim 1, wherein the folding station includes at least one form over which the web is pulled, the form folding a center region of the web into a V-shape, which is sandwiched between two outer portions of the web into a W-shape to form a standup bottom of the pouch.

12. The machine of claim 11, wherein:
   a first inner portion of the web and a second inner portion of the web define the V-shaped center region of web;
   a punch structure of the first electromagnetic punch and/or the second electromagnetic punch is aligned with the first inner portion of the web, the first inner portion of the web including a first hole punched into the web via the punch structure; and
   another punch structure of the first electromagnetic punch and/or the second electromagnetic punch is aligned with the second inner portion of the web, the second inner portion of the web including a second hole punched into the web via the another punch structure.

13. The machine of claim 12, wherein the folding station further includes an edge control engaging and positioning an edge of each of the two outer portions of the web at the same height with the first hole and the second hole in alignment with one another.

* * * * *